(12) United States Patent
Policicchio et al.

(10) Patent No.: US 10,694,915 B2
(45) Date of Patent: Jun. 30, 2020

(54) SHEET WITH TOW FIBER AND MOVABLE STRIPS

(71) Applicant: The Procter & Gamble Company, Cincinnati, OH (US)

(72) Inventors: Nicola John Policicchio, Mason, OH (US); Larry L. Huston, West Chester, OH (US)

(73) Assignee: The Procter & Gamble Company, Cincinnati, OH (US)

(*) Notice: Subject to any disclaimer, the term of this patent is extended or adjusted under 35 U.S.C. 154(b) by 461 days.

(21) Appl. No.: 15/480,658

(22) Filed: Apr. 6, 2017

(65) Prior Publication Data

US 2018/0289234 A1 Oct. 11, 2018

(51) Int. Cl.
| | |
|---|---|
| *A47L 13/16* | (2006.01) |
| *A47L 13/38* | (2006.01) |
| *A47L 13/10* | (2006.01) |
| *A47L 13/20* | (2006.01) |
| *B32B 7/12* | (2006.01) |
| *B32B 5/26* | (2006.01) |
| *A47L 13/255* | (2006.01) |
| *A47L 13/44* | (2006.01) |
| *B32B 3/26* | (2006.01) |

(52) U.S. Cl.
CPC .............. *A47L 13/16* (2013.01); *A47L 13/10* (2013.01); *A47L 13/20* (2013.01); *A47L 13/255* (2013.01); *A47L 13/38* (2013.01); *A47L 13/44* (2013.01); *B32B 3/26* (2013.01); *B32B 5/26* (2013.01); *B32B 7/12* (2013.01)

(58) Field of Classification Search
CPC .......... A47L 13/00; A47L 13/10; A47L 13/16; A47L 13/20; A47L 13/38
USPC ......... 15/208, 209.1, 223, 226, 229.1–229.4, 15/229.6–229.8
See application file for complete search history.

(56) References Cited

U.S. PATENT DOCUMENTS

| | | | |
|---|---|---|---|
| 823,725 A | 6/1906 | Hayden | |
| 4,145,787 A | 3/1979 | Bastian | |
| 5,691,035 A | 11/1997 | Chappell et al. | |
| 5,953,784 A * | 9/1999 | Suzuki | A47L 13/20 |
| | | | 15/145 |
| 5,960,508 A | 10/1999 | Holt et al. | |
| 6,003,191 A | 12/1999 | Sherry et al. | |
| 6,048,123 A | 4/2000 | Holt et al. | |
| 6,143,393 A | 11/2000 | Abe et al. | |
| 6,245,413 B1 | 6/2001 | Kenmochi et al. | |

(Continued)

FOREIGN PATENT DOCUMENTS

| | | |
|---|---|---|
| WO | WO2016161234 A1 | 10/2016 |
| WO | WO2017003652 A1 | 1/2017 |

OTHER PUBLICATIONS

Case 14767 PCT Search Report; PCT/US2018/026216; dated Jul. 23, 2018; 13 Pages.

*Primary Examiner* — Mark Spisich
(74) *Attorney, Agent, or Firm* — John T. Dipre

(57) ABSTRACT

A cleaning article for cleaning a target surface. The cleaning article has strips which present a dynamically changing surface area to the target surface during use. The surface area has also has a bundle of tow fibers which may be oriented transverse to the strips. The tow fibers may extend outwardly from the plane of the strips, allowing particles to migrate towards and be retained near the center of the cleaning article, without interfering with the strips.

20 Claims, 9 Drawing Sheets

(56) References Cited

U.S. PATENT DOCUMENTS

| | | |
|---|---|---|
| 6,550,092 B1 | 4/2003 | Brown et al. |
| 6,601,261 B1 | 8/2003 | Holt et al. |
| 6,681,434 B2 | 1/2004 | Smith |
| 6,701,567 B2 | 3/2004 | Smith |
| 6,766,552 B1 | 7/2004 | Policicchio et al. |
| 6,813,801 B2 | 11/2004 | Tanaka et al. |
| 7,003,856 B2 | 2/2006 | Hayashi et al. |
| 7,028,364 B2 | 4/2006 | Policicchio et al. |
| 7,191,486 B1 | 3/2007 | Michelson et al. |
| 7,291,359 B2 | 11/2007 | Haskett et al. |
| 7,386,907 B2 | 6/2008 | Otsuka et al. |
| 7,458,128 B2 | 12/2008 | Smith et al. |
| 7,480,956 B2 | 1/2009 | Policicchio et al. |
| 7,566,671 B2 | 7/2009 | Hoadley et al. |
| 7,624,468 B2 | 12/2009 | Reddy et al. |
| 7,694,379 B2 | 4/2010 | Glaug |
| 7,721,381 B2 | 5/2010 | Michelson et al. |
| 7,779,502 B2 | 8/2010 | Fujiwara et al. |
| 7,803,726 B2 | 9/2010 | Policicchio et al. |
| 7,937,797 B2 | 5/2011 | Tsuchiya et al. |
| 8,146,197 B2 | 4/2012 | Yamada |
| 8,151,402 B2 | 4/2012 | Takabay et al. |
| 8,161,594 B2 | 4/2012 | Policicchio et al. |
| 8,186,001 B2 | 5/2012 | Tsuchiya et al. |
| 8,245,349 B2 | 8/2012 | Tsuchiya et al. |
| 8,341,797 B2 | 1/2013 | Young |
| 8,528,151 B2 | 9/2013 | Przepasniak |
| 8,707,505 B2 | 4/2014 | Maranghi et al. |
| 8,752,232 B2 | 6/2014 | Otsuka et al. |
| 8,756,746 B2 | 6/2014 | Policicchio |
| 8,763,197 B2 | 7/2014 | Policicchio et al. |
| 8,793,832 B2 | 8/2014 | Yamada |
| 8,863,347 B2 | 10/2014 | Wildeman |
| 9,032,577 B2 | 5/2015 | Colangelo |
| 9,296,176 B2 | 3/2016 | Escaffre et al. |
| 2007/0212157 A1* | 9/2007 | Hoadley ............... A47L 13/16 401/136 |
| 2008/0028560 A1 | 2/2008 | Policicchio et al. |
| 2008/0148508 A1* | 6/2008 | Yamada ............... A47L 13/16 15/229.3 |
| 2010/0088837 A1* | 4/2010 | Wada ............... A47L 13/16 15/209.1 |
| 2011/0041274 A1 | 2/2011 | Ogale |
| 2011/0119852 A1* | 5/2011 | Tanaka ............... A47L 13/16 15/209.1 |
| 2012/0311803 A1* | 12/2012 | Yamada ............... A47L 13/255 15/209.1 |
| 2015/0359404 A1* | 12/2015 | Suda ............... A47L 13/38 15/111 |
| 2016/0037993 A1 | 2/2016 | Policicchio |
| 2016/0296094 A1* | 10/2016 | Hargett ............... A47L 13/16 |

\* cited by examiner

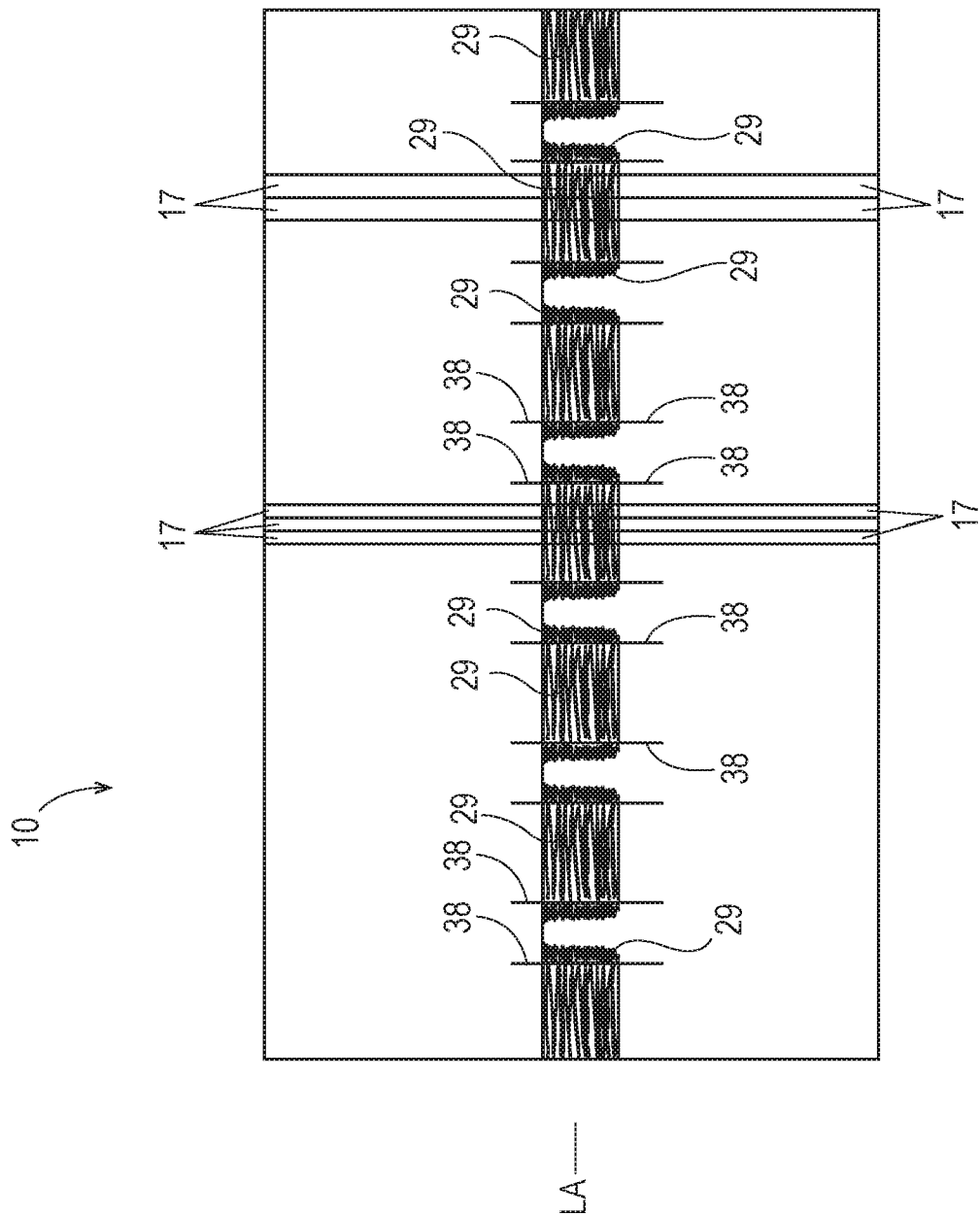

SHEET WITH TOW FIBER AND MOVABLE STRIPS

FIELD OF THE INVENTION

The present invention relates to cleaning articles presenting a dynamic surface area to target surface during routine cleaning.

BACKGROUND OF THE INVENTION

Various cleaning articles have been created for dusting and light cleaning. For example, cloth rags and paper towels used dry or wetted with polishing and cleaning compositions have been used on relatively flat surfaces such as countertops, showers, sinks and floors. Laminiferous wipes have been proposed, as disclosed in U.S. Pat. No. 9,296,176. But, rags, wipes, and paper towels are problematic for reasons such as hygiene (the user's hands may touch chemicals, dirt or the surface during cleaning), reach (it may be difficult to insert the user's hand with the rag, wipe or paper towel into hard-to-reach places) and inconvenience (cleaning between closely-spaced articles typically requires moving the articles).

To overcome the problems associated with using rags and paper towels, various reusable dust gathering devices using felt and hair have been utilized for more than a century, as illustrated by U.S. Pat. No. 823,725 issued in 1906 to Hayden and using yarns as illustrated in U.S. Pat. No. 4,145,787. To address the problems with reusable dust gathering devices, disposable cleaning articles have been developed which have limited re-usability. These disposable cleaning articles may include brush portions made of synthetic fiber bundles, called tow fibers, attached to a sheet as shown in U.S. Pat. Nos. 6,813,801; 7,003,856; 7,566,671; 7,779,502; 7,937,797; 8,146,197; 8,151,402; 8,161,594; 8,186,001; 8,245,349; 8,528,151; 8,756,746 and 8,763,197.

Disposable dusters having tow fibers may provide for wet cleaning as disclosed in U.S. Pat. No. 7,566,671 and in commonly assigned U.S. Pat. No. 7,803,726 and commonly assigned US 2008/0028560. But tow fibers may become matted when wet and not be suitable for cleaning a large or heavily wetted surface, such as a floor. Thus, dusters may not be suitable for cleaning extremely large or heavily soiled surfaces. Instead, sheets having fibers have been proposed, as disclosed in U.S. Pat. Nos. 8,752,232; 8,793,832 and in commonly assigned U.S. Pat. No. 8,075,977. Webs with elastic behavior have been proposed in commonly assigned U.S. Pat. No. 5,691,035. Sheets with recesses have also been proposed, as disclosed in U.S. Pat. Nos. 6,245,413; and 7,386,907. Sheets with cavities have been proposed, as disclosed in U.S. Pat. No. 6,550,092. An adhesive cleaning sheet is proposed in U.S. Pat. No. 7,291,359.

To overcome the problem of large and/or heavily wetted surfaces, mops which are repeatedly dunked into a bucket of liquid have been used. But these mops become saturated and can redeposit large amounts of dirty liquid onto the floor. Accordingly, disposable floor sheets have been developed. These floor sheets may contain large amounts of absorbent cellulose, as disclosed in U.S. Pat. Nos. 7,191,486 and 7,721,381, and may include at least two interior sheets as disclosed in U.S. Pat. No. 9,032,577. Floor sheets may contain AGM to further assist in liquid absorption and retention, as disclosed in commonly assigned U.S. Pat. Nos. 5,960,508; 6,003,191; 6,048,123; 6,601,261 and 6,766,552. But if insoluble soils are not removed from the floor, or if soluble soils are inadequately absorbed by the floor sheet, streaking and/or filming may occur.

One attempt to clean overcome this problem is found in microfiber cleaning pads. Microfiber pads may be nylon and are intended to be washed and reused. But microfiber pads may damage the floor and still leave filming/streaking, particularly after repeated washings.

This problem is exacerbated by some of the newer floor materials. For example, certain new flooring materials are relatively dark in color. And newer flooring materials may have relatively high gloss levels, and/or be difficult to wet during cleaning, due to surface energy. These properties may highlight filming/streaking which is left on the floor after wet cleaning, even if damage to the floor does not occur.

Yet other attempts to make cleaning pads incorporate both hydrophobic and hydrophilic properties, as disclosed in U.S. Pat. No. 7,694,379 and commonly assigned U.S. Pat. No. 7,480,956. Another attempt includes free floating cuffs, as disclosed in commonly assigned U.S. Pat. No. 7,028,364. Other relevant attempts in the art include US 2003/0300991; 2011/0041274; 2016/0037993; U.S. Pat. Nos. 6,245,413; 6,681,434; 6,701,567; 7,458,128; 7,624,468; 8,341,797; 8,707,505 and 8,863,347.

While these attempts are directed to absorption of liquids from a wetted target surface, particularly from a floor, problems remain. A generally flat floor sheet presents the same surface to the floor throughout the cleaning task. Dirt can be re-deposited if the floor sheet is saturated. A generally flat floor sheet may not adequately clean into floor crevices or grout lines. Damage to the floor may occur if a reusable microfiber floor pad is used.

Thus, there is a need for a disposable, generally planar cleaning article, usable on wetted surface and which presents dynamically changing surface throughout the cleaning task. A generally planar pad can be removably disposed on the head of a cleaning implement, such as a Swiffer® implement, sold by the instant assignee. The head of such an implement is also generally planar and typically mounted to a handle through a universal joint. This arrangement allows the user to apply compressive pressure where extra cleaning is needed. The use of a removable, generally planar sheet on such an implement is desirable as providing both cleaning capability and protecting the surface, through the combination of strip mobility under compression applied through the handle.

SUMMARY OF THE INVENTION

The invention comprises a cleaning article having a laminate construction. The cleaning article comprises a sheet and cleaning strip element joined together at an elongate bond. The cleaning strip element has strips extending outwardly from the bond. A plurality of tow fibers are joined to said cleaning strip element, and oriented generally transverse to the strips.

BRIEF DESCRIPTION OF THE DRAWINGS

FIG. 1 is an exploded perspective view of a cleaning article according to the present invention.

FIG. 3A is a broken bottom plan view of a cleaning article having a single elongate tow fiber bundle and two opposed rows of strips, each strip having a sinusoidal length.

FIG. 3B is a bottom plan view of a cleaning article having plural elongate tow fiber bundle layers, one tow fiber bundle being of constant width and one having variable width, and with two opposed rows of strips, each strip having a sinusoidal length.

FIG. 3E1 is a schematic bottom plan view of a cleaning article having a variable width hourglass shaped tow fiber bundle and diagonally oriented strips, with one side having strips of constant length and one side having strips of variable length.

FIG. 3E2 is a schematic bottom plan view of a cleaning article having a variable width barrel shaped tow fiber bundle and strips with variable width and variable length.

FIG. 3H is a schematic bottom plan view of a cleaning article having spaced apart bonds and the tow fiber bundle cut intermediate the spaced bonds.

FIG. 4 is a perspective view of a handle usable with the present invention.

FIG. 5B is a perspective view of a floor cleaning implement usable with the present invention and having an optional spray system.

DETAILED DESCRIPTION OF THE INVENTION

Figure 1:
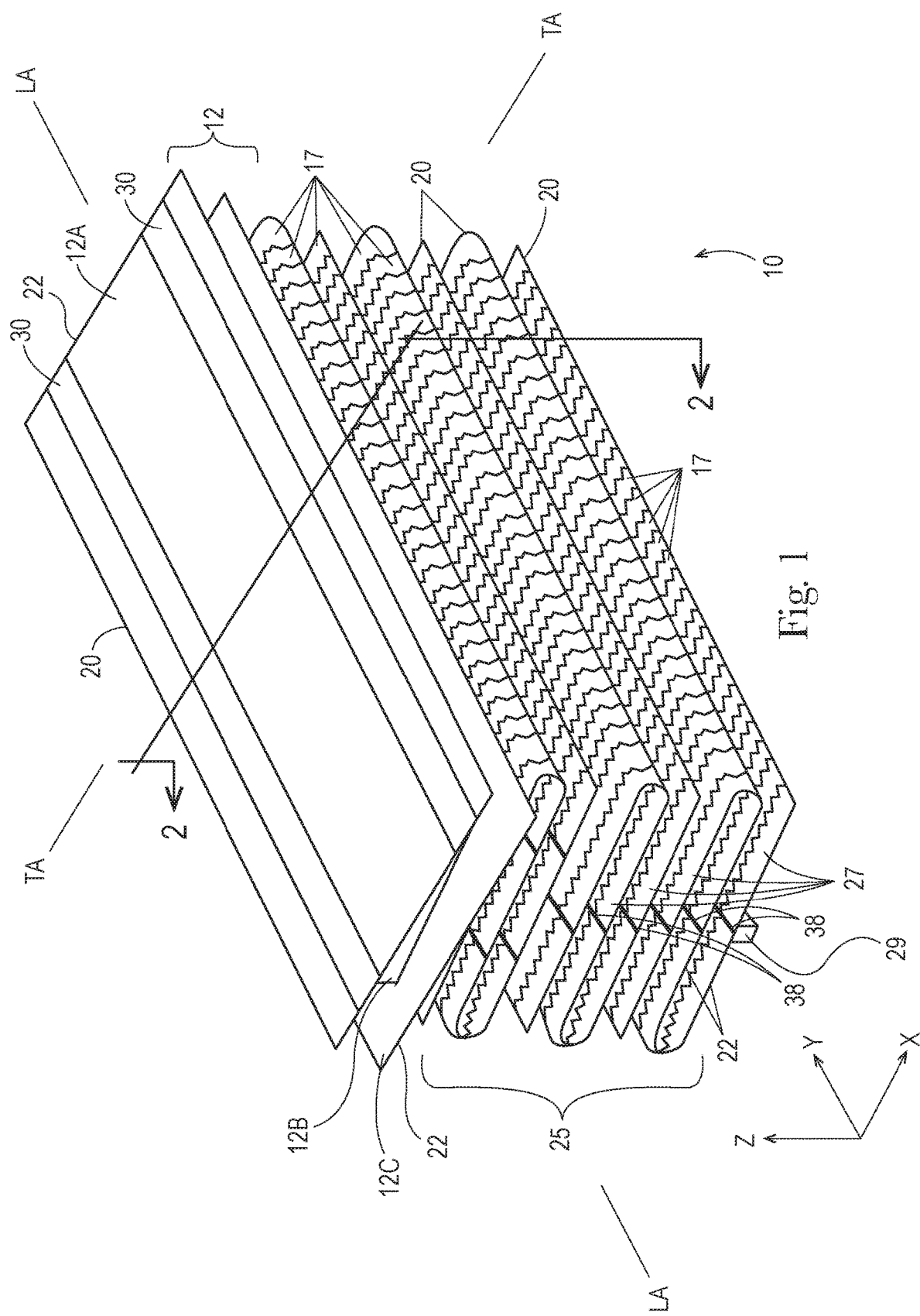
FIGS. 1, 3A, 3B, 4 and 5B are drawn to scale.

Referring to FIG. 1, the cleaning article 10 may be generally elongate, and rectangular, although other shapes are contemplated and feasible. The cleaning article 10 may comprise two or more components joined in a laminate form to provide cleaning article 10 suitable for floor cleaning. The cleaning article 10 may have a carrier sheet 12, which forms a frame for attachment of other components thereto. The cleaning article 10 may also have a cleaning strip element 25, having one or more layers 27 of stacked, outwardly extending, flexible strips 17. A bundle of tow fibers 29 is superimposed on the strips 17 and oriented transversely thereto. An optional absorbent core may be disposed between the cleaning strip element 25 and the sheet 12.

The cleaning article 10 may be disposable. By disposable it is meant that the cleaning article 10 may be used for one cleaning task, or generally for not more than several square meters, then discarded. In contrast, a reusable cleaning article 10 is laundered or otherwise restored after use.

The cleaning article 10 may have a longitudinal axis LA and a transverse axis TA orthogonal thereto. The cleaning article 10, and respective components thereof, may have two longitudinal edges 20 parallel to the longitudinal axis LA and two transverse edges 22 parallel to the transverse axis TA.

The length of the cleaning article 10 is taken in the longitudinal direction. The width of the cleaning article 10 corresponds to the transverse direction perpendicular to the length direction and disposed within the plane of the sheet 12. The thickness is defined as the dimension in the Z-direction. The XY plane is defined as the plane defined by the cleaning article 10. The Z-direction of the cleaning article 10 is the direction perpendicular to the plane of the cleaning article 10. The cleaning article 10 may have a length from 20 to 50 cm and a width of 10 to 20 cm. The cleaning article 10 may particularly be 30+/−2 cm long by 14+/−2 cm wide, as measured at the greatest dimensions, in order to fit the head of a typical cleaning implement 70, as discussed below. The optional core may particularly have a width of 6.5+/−2 cm and a length of 26+/−2 cm. Of course, one of skill will recognize that other shapes are feasible and within the scope of the present invention.

Referring to FIGS. 2A-2F, the cleaning article 10 has at least two, more preferably at least three, four or more laminae joined/folded in laminate form the cleaning article 10. The carrier sheet 12 may also provide for attachment to a floor cleaning implement as described below. As used herein, unless otherwise specified, being joined includes a direct and contacting relationship between two components and a relationship having an intermediate component therebetween.

As discussed below the strips 17 may be advantageously substantially, or preferably entirely, contained within the footprint of the sheet 12. Particularly, the distal ends of the strips 17 may be contained within and bounded by the footprint defined by the two longitudinal edges 20 and two transverse edges 22 of the sheet 12. This arrangement is believed to promote mobility of the strips 17 in use, and present a dynamic surface area of the cleaning article 10 to the target surface in use, due to the direct pressure the strip 17 encounter when the user presses a cleaning implement against a floor.

While a cleaning strip element 25 having two opposed pairs of outwardly oriented strips 17 are shown, one of skill will recognize the invention is not so limited. A single row of strips 17 or different arrangements of strips 17 may be utilized. The tow fiber bundle 29 may be disposed between the proximal ends of the opposed outwardly oriented strips 17. Such an arrangement allows for the tow fiber bundle 29 to overlap the strips 17 of either or both opposed rows of strips 17.

The cleaning article 10 may have an outwardly facing cleaning side and an attachment side opposed thereto. The attachment side of the cleaning article 10 may have one or more attachment stripes 30 for attachment to the head of an implement, two parallel stripes 30 being illustrated for example. The stripes 30 may comprise loop material suitable for complementary attachment to a head of a cleaning implement having hooks.

More particularly, the cleaning article 10 may comprise a construction of at least one tow fiber bundle 29 and at least one cleaning strip element 25. The tow fiber bundle 29 and cleaning strip element 25 are joined in face-to-face relationship with at least one permanent bond 38 to form a laminate. The laminae comprising the cleaning strip element 25 may be particularly prefolded in serpentine fashion to provide a plurality of laminae in the Z-direction.

Figure 2A:
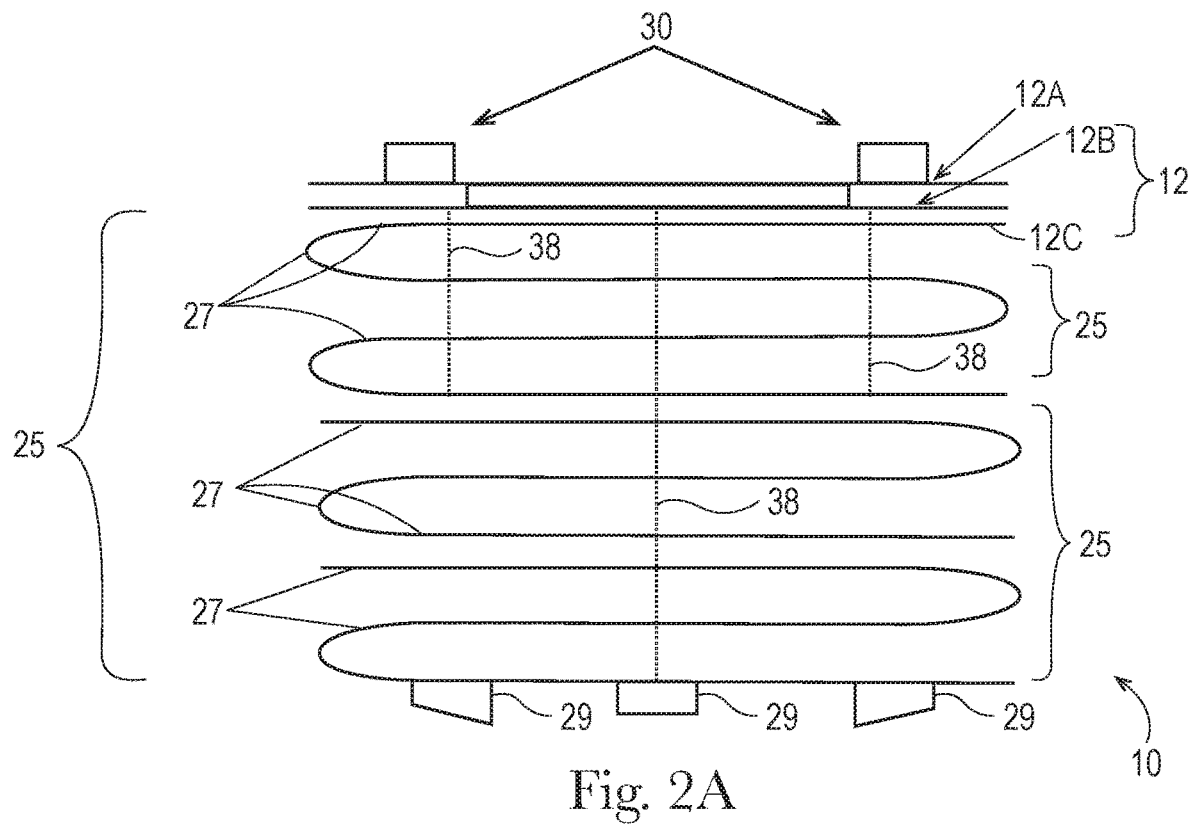
FIG. 2A is a vertical sectional view taken along lines 2-2 of FIG. 1 and having three tow fiber bundles, an center tow fiber bundle of constant thickness and two outward tow fiber bundles of increasing thickness as the longitudinal axis is approached.
Figure 2B:
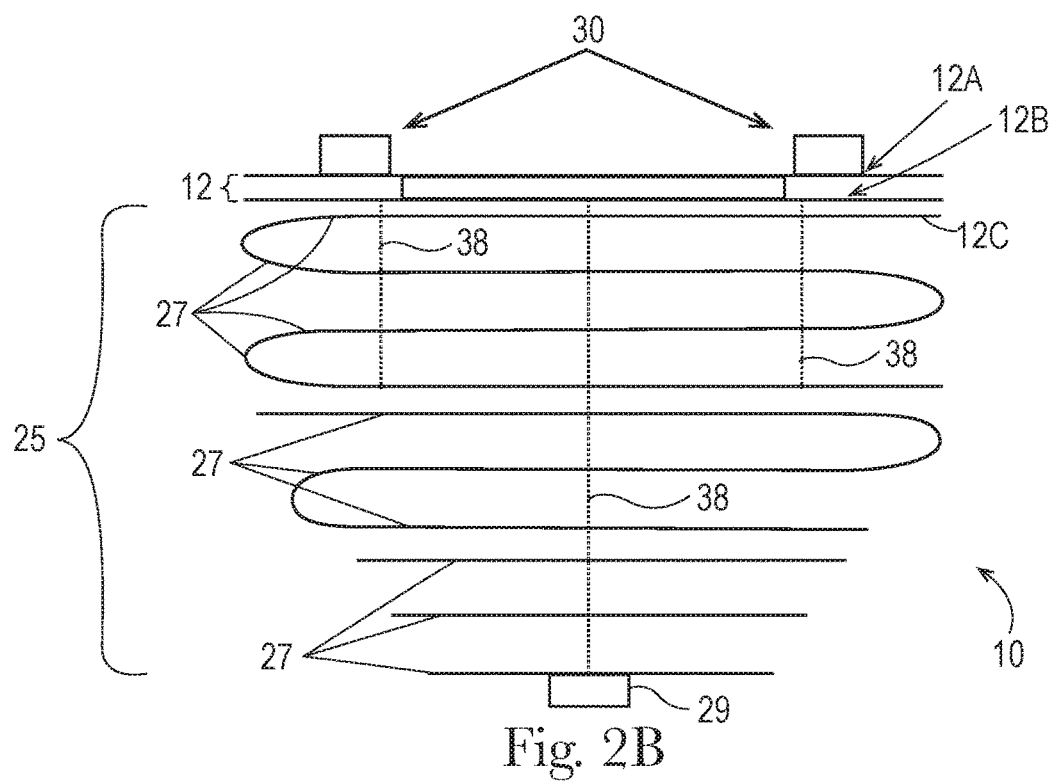
FIG. 2B is a vertical sectional view of an alternative embodiment cleaning article having a cleaning strip element with an inverted pyramidal geometry.
Figure 3A:
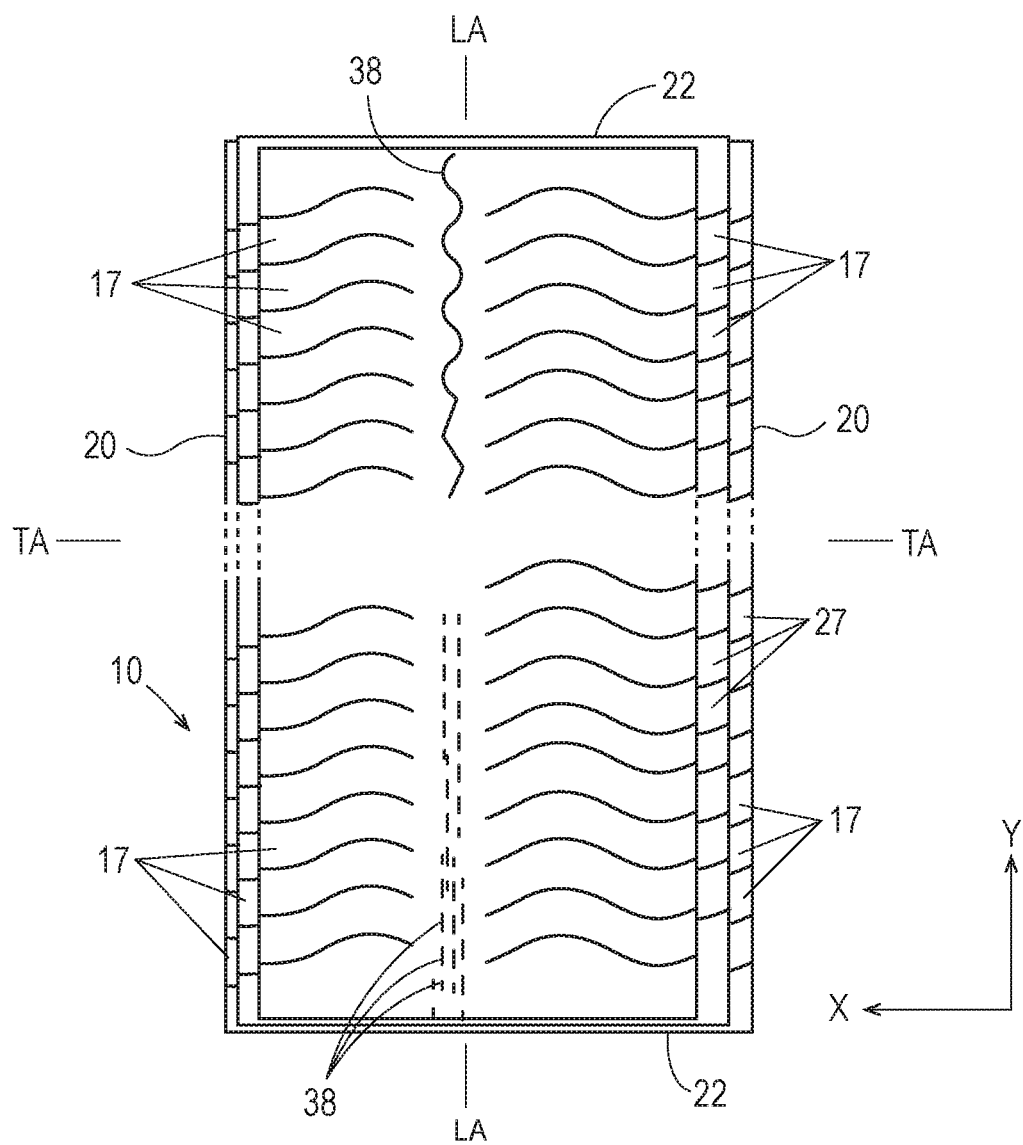
Figure 2C:
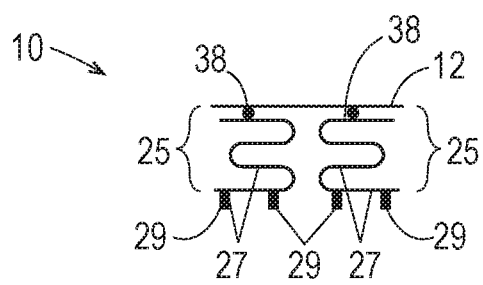
FIG. 2C is a schematic vertical sectional view of an alternative embodiment cleaning article having two cleaning strip elements, each with plural tow fiber bundles.
Figure 2D:
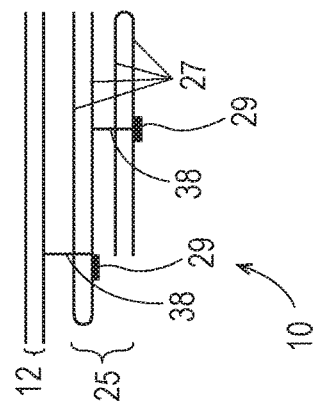
FIG. 2D is a schematic vertical sectional view of an alternative embodiment cleaning article having two tow fiber bundles disposed in mutually different planes.
Figure 3B:
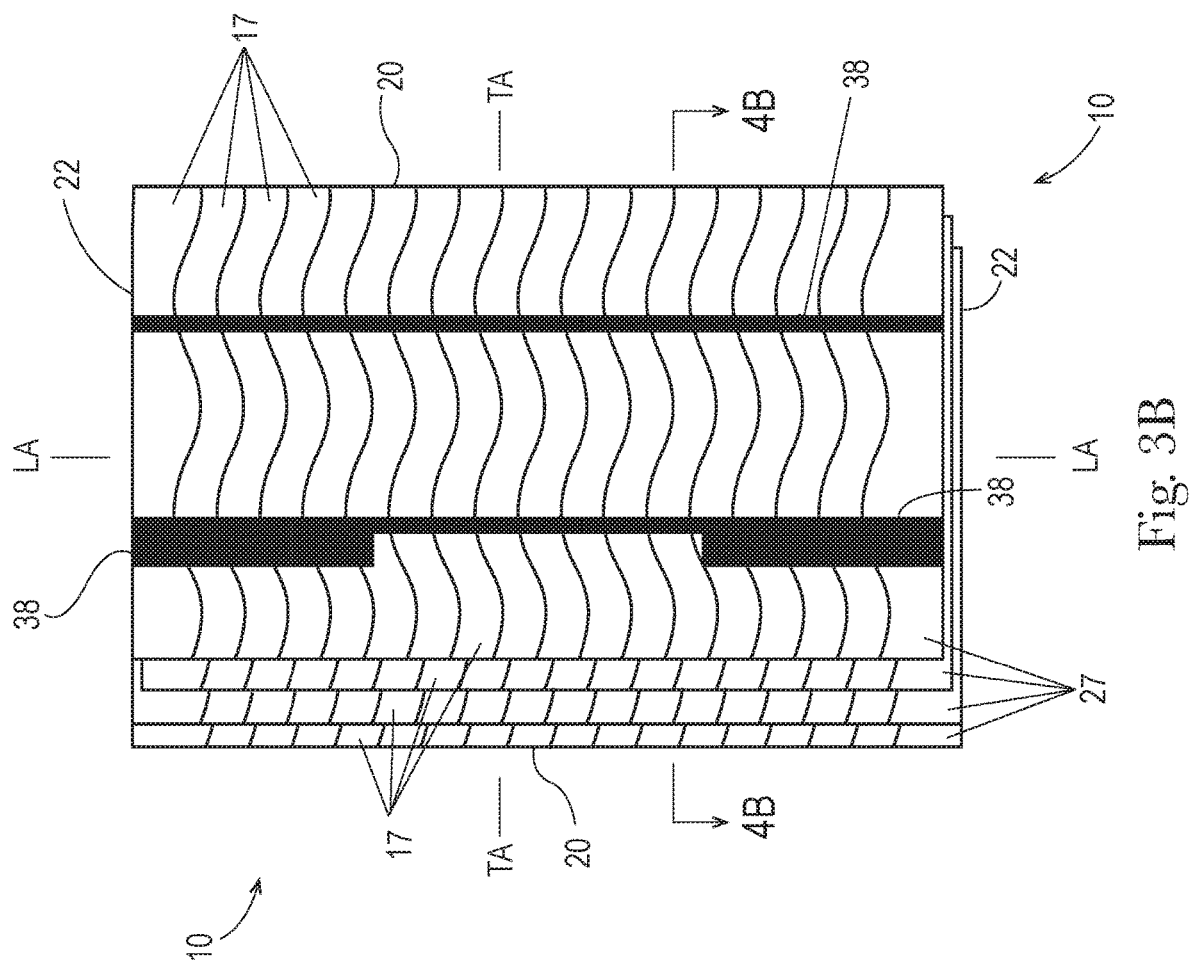

Referring particularly to FIG. 2B, the cleaning strip element 25 may comprise a serpentine folded member with the width decreasing as the distal edge of the cleaning strip element 25 is approached. This geometry provides an inverted pyramidal construction, in use. Such a construction of the cleaning strip element 25 may provide for plural layers 27 of the cleaning strip element 25 having plural widths. The widths may decrease from the first layer 27 to the distal layers 27 and may particularly monotonically decrease in width from the first layer 27 to the distal layers 27. The inverted pyramidal construction is prophetically believed to advantageously present more edges to the target surface during cleaning.

Referring to FIGS. 2A-2F, the optional carrier sheet 12 may serve as a chassis for attachment of the cleaning strip element 25 thereto. Other laminae and features may be interposed between the sheet 12 and cleaning strip element 25, without departure from the invention.

The carrier sheet 12 may particularly comprise a synthetic nonwoven sheet 12. A carrier sheet 12 having synthetic fibers provides for convenient joining of the cleaning strip element 25 thereto. Nonwovens include spun bonded, carded and airlaid materials, as are known in the art and made from synthetic fibers. A suitable nonwoven sheet may be made according to commonly assigned U.S. Pat. No. 6,797,357. The carrier sheet 12 may comprise a polyolefinic film, which and be liquid impervious.

The carrier sheet 12 may comprise cellulose, to provide absorptive capacity. A cellulosic sheet 12 may have permanent wet strength resin added thereto, as is known in the art. Or the carrier sheet 12 may preferably comprise a mixture of cellulosic and synthetic fibers, to provide both absorptive and barrier properties, and for convenient joining of the cleaning strip element 25. By cellulosic it is meant that the component comprises a predominant weight percentage of cellulosic fibers.

The carrier sheet 12 and/or cleaning strip element 25 may be hydrophilic, to advantageously absorb water from the surface being cleaned. By hydrophilic it is generally meant that the component will absorb water in use and retain such water in ordinary use without the application of excessive compressive force.

Hydrophilic vs hydrophobic properties may be measured as follows. A 1 gram sample of material, is oven dried at about 110° C. for 12 hours, then conditioning at 65% relative humidity/21° C. for five days. The sample is then re-dried at 110° C. for 12 hours. The amount of moisture gained is measured as a percentage of moisture regained:

moisture regained=[(total conditioned sample weight at 65% RH−sample weight after drying)÷dried sample weight]×100%.

As used herein, hydrophilic material has a moisture regain at 65% greater than about 2%, 3%, 4%, 5% and preferably greater than about 6%. Table 1 below shows comparisons of different fiber types for % moisture regain at equilibrium in 65% RH.

TABLE 1

Moisture Regain (Percentage)

| Hydrophilic Fibers | | | | | Hydrophobic fibers | | | |
|---|---|---|---|---|---|---|---|---|
| Cellulose | Rayon | Cotton | Acetate | Triacetate | Polyester | Acrylic | Polyethylene | Polypropylene |
| 12-15 | 11-13 | 7-8 | 6.0-6.5 | 4.0-4.5 | 0.4 | 1.5-2.0 | <0.1 | <0.1 |

While hydrophilic materials may be useful for the invention described herein, such materials may not have sufficient strength for use in even a disposable cleaning article 10. Thus, the selection of proper materials is important.

For example, if the cleaning strips 17 are 100% cellulose a wet co-efficient of friction may be so great it is difficult for a user to move cleaning article 10 across a particular target surface. By intermixing different materials surface area for soil collection can be maintained while the wet coefficient of friction is optimized. Likewise, using cleaning strips 17 of varying lengths, even with the same material, can increase cleaning surface area without unduly increasing wet coefficient of friction, providing for ease of movement across the target surface.

The optional carrier sheet 12 may comprise a laminate of two, three or more plies. The laminate may particularly comprise three plies, an outwardly facing ply 12A for contact with a cleaning implement, a central ply/core 12B for absorption and an inwardly facing ply 12C for joining to the cleaning strip element 25.

The three plies 12A, 12B and 12C may be permanently joined together using adhesive and/or thermal bonds 38 as are known in the art to form an optional carrier sheet 12. Optional attachment stripes 30 of loop or similar material may be joined to the outwardly facing surface of outwardly ply 12A to removably join the cleaning article 10 to a handle 60 or implement 70. The stripes 30 may be continuous or discontinuous. If the optional carrier sheet 12 is not used, the stripes 30 may be directly attached to the outwardly oriented surface of the cleaning strip element 25.

The outwardly facing ply 12A may comprise a hydroentangled spunbond nonwoven with a basis weight of 20 to 80 gsm. A 45 gsm nonwoven from Avgol Nonwovens of Tel-Aviv, Israel has been found suitable. As used herein a nonwoven is a component having a mixture of airlaid and/or wetlaid fibers not woven together. Ply 12A may be covered by or comprise an outwardly facing liquid impermeable barrier. The barrier prevents absorbed liquids from contacting the user's hand, implement, etc. A suitable barrier includes LDPE film as is known in the art.

The central ply/core 12B may serve as a storage reservoir, to absorb and retain liquids collected from the target surface by the cleaning strip element 25. The central ply/core 12B may comprise a bicomponent cellulose/synthetic airlaid. A 135 gsm airlaid comprising 85:15 cellulose:bicomponent fibers available from Suominen of Helsinki, Finland is suitable.

The central ply/core 12B may further comprise absorbent gelling materials [AGM], as are known in the art. The AGM may increase retention of absorbed liquid and provide for increased capacity of the cleaning article 10. The cleaning article 10 may be free of foam, to conserve costs.

The inwardly facing ply 12C may comprise a mixture of wet laid fibers formed into a tissue which is bonded onto a synthetic nonwoven using process such as spun lace or hydroentangling. The inwardly facing ply 12C may comprise 23 gsm tissue with a 17 gsm polypropylene spunbond as a composite, sold under the name Genesis tissue by Suominen of Helsinki, Finland.

If desired, a dedicated core 12B may be incorporated into the cleaning article 10. The dedicated core 12B may be between any of the plies 12A, 12C of sheet 12 or disposed on the inwardly or outwardly oriented face of sheet 12. The core 12B may particularly comprise the central ply. The core 12B and/or additional/alternative central ply may be narrower than the outwardly facing ply 12A and inwardly facing ply 12C. The core 12B and/or central ply may be about half of the width of the outwardly facing ply 12A and inwardly facing ply 12C, and centered on the longitudinal axis. Particularly the width of the core 12B and/or central ply may be less than or equivalent to the spacing between the stripes 30 of attachment material.

The cleaning strip element 25 may comprise one ply or plural plies. Plural plies may be folded in serpentine fashion. This arrangement provides at least a double, triple or greater thickness. When a folded layer 27 is cut into generally transversely oriented individual cleaning strips, the double thickness provides a loop at the distal end of a respective strip 17. The loop is believed to be advantageous, as it helps to space apart strips 17 overlaid in the Z-direction.

The folded configuration may be accomplished with a c-fold. One of skill will recognize that c-folds may be cascaded to provide a z-fold, w-fold or other plural layer folds as are known in the art and which encompass a c-fold.

The cleaning strip element 25 may comprise from 1 to 25, 5 to 20, and particularly about 6-8 layers 27 of cleaning strips 17, depending upon the desired absorbent capacity and texture of the intended target surface. The cleaning strips 17 disposed on each edge, particularly the longitudinal edges may advantageously comprise loops at the distal ends and a free end having a single thickness at the distal ends of the cleaning strips 17 to provide differential response during cleaning and prophetically reach and retain more debris during cleaning.

Particularly, the differential response of the cleaning strips is believed to present a dynamically changing surface area to the target surface during cleaning, under normal usage conditions. By changing the surface area, more liquids, and associated debris, can be cleaned from the target surface.

A non-limiting cleaning strip element 25 having three separate cleaning strip materials is shown. The upper sheet, closer to the sheet 12, is folded upon itself to provide four cleaning strip layers 27. The two lower cleaning strip 17 layers 27 are z-folded upon themselves to each provide three cleaning strip layers 27.

The difference in width between the opposed cleaning strips 17 and the optional core 12B is believed to promote stability of the core 12B and/or central ply 12B, for retaining liquids transferred from the cleaning strip element 25. Furthermore, this geometry is believed to assist in draining the cleaning strips 17 of absorbed liquid. Further, this geometry provides a gap, which is believed to promote movement of the cleaning strips 17, presenting different portions thereof to the target surface in response to user movement of the cleaning article 10 during ordinary use.

One or more tow fiber bundles 29 may be utilized. Plural tow fiber bundles 29 provide the benefit of greater tow fiber 29 mass and availability, to prophetically capture more particles. Each tow fiber bundle 29 may be closer to a respective longitudinal edge 20, to more closely intercept the particles. While a plurality of two fiber 29 bundle layers is shown in the respective figures, one of skill will recognize three or more tow fiber bundles 29 may be utilized in a single cleaning article 10.

Referring to FIGS. 3A-3H, the cleaning article 10 may comprise opposed rows of hydrophilic cleaning strips 17 disposed in a cleaning strip element 25. As used herein, cleaning strips 17 refer to strips extending outwardly from proximal ends to respective distal ends. The individual cleaning strips 17 may have a proximal end at or offset from the longitudinal centerline of the article 10, and having a length (taken in the transverse direction) greater than the corresponding width (as taken in the longitudinal direction), to provide an aspect ratio of at least 1 and optionally 2 to 20, and optionally 5 to 15. The cleaning strips 17 may have a length, taken from a respective proximal end juxtaposed with a bond 38 to a respective distal end, which may be juxtaposed with a longitudinal edge 20 of the cleaning article, of 3 to 15, 4 to 12 or particularly 5 to 8 cm, and a width of 3 to 20, 4 to 15 or particularly 6 to 8 mm. These particular dimensions have been found suitable for use in floor cleaning, when using a cleaning implement.

The cleaning strips lie within the XY plane as intended by manufacture, although may be deformed out of the XY plane due to fluffing before use, and/or deformations which occur in use due to movement against the target surface. The cleaning strips 17 may be incorporated into one of the sheets 12 described herein or may be deployed on a separate sheet 12. The cleaning strips 17 may extend parallel to the width direction of the article, or may be disposed in acute angular relationship thereto. The cleaning strips 17 may be straight, as shown, curved, serpentine or of any desired shape.

The cleaning strip element 25 may comprise the same materials as described above for inwardly facing ply 12C, and particularly be hydrophilic, and more particularly comprise a composite of cellulose and nonwoven. More particularly, the strips 17 may comprise a laminate of alternating cellulose and nonwoven sheet or fibers. Or the cellulose fibers and synthetics fibers may simply be interspersed in the thickness direction. Optionally the strips 17 may have a polyolefinic film layer, such as LDPE. Optionally, the strips 17 may comprise foam.

The strips 25 may also include nanofibers, and may range in denier from 0.1 to 100 denier. Non-round synthetic fibers, including capillary channel fibers may be used. Capillary channel fibers may be tri-lobal, C-shaped, H-shaped, etc. Bi-component fibers, particularly having a PP core and PE sheath may be used to provide both bonding and resiliency. If desired the fibers may be elastomeric. The synthetic fibers may be short cut, or even powder. The strips 25 may be apertured.

The strips 25 may comprise less than 60%, 50%, or 30% by weight of cellulose and at least 40%, 50%, or 70% by weight of synthetic fibers. It is understood the fibers may be airlaid, wetlaid or provided as a carrier sheet. Suitable synthetic fibers include PE, PLA, PET, Nylon and bicomponent combinations thereof. The suitable material may be made according to the teachings of U.S. Pat. No. 9,296,176 assigned to Suominen Corp. The cellulose fibers may comprise hardwood, softwood and blends thereof.

If desired, the strips 25 may be made of a fibrous woven or nonwoven sheet having high bulk or terry cloth-like properties. Such strips may have discrete tufts of fibers, formed from and integral with a precursor web. The strips may have from 10 to 100 discrete tufts per square centimeter. The tufts advantageously provide protrusions for cleaning. Strips having tufts may be made according to commonly assigned U.S. Pat. Nos. 7,682,686, 7,838,099 and/or 8,075, 977.

The cleaning strip element 25 may preferably comprise polypropylene spunbond as a composite, such as the aforementioned Genesis tissue by Suominen of Helsinki, Finland. The cleaning strip element 25 and/or the sheet 12 may alternatively or additionally comprise microfiber, as is known in the art.

While the cleaning strip element 25 is shown to have strips throughout the longitudinal extent of the cleaning article 10, one of skill will recognize the invention is not so limited. The strips may be disposed along any significant portion of the longitudinal edges 20.

The sheet 12 and cleaning strip element 25 may be joined by a plurality of bonds 38, as set forth below. The bonds 38 may be thermal, adhesive or ultrasonic, etc. as are known in the art.

A central bond 38 may join all layers 27/laminae of the cleaning article 10, to ensure a unitary construction and prevent loss of individual components in use. The central bond 38 may be common to all layers 27 of the cleaning strip element 25, and directly or indirectly join each layer 27 of the cleaning strip element 25 to the sheet 12.

Two outboard bonds 38 may be provided and join only layers 27 of the cleaning strip element 25 proximate to the sheet 12. For the embodiment described herein the outboard bonds 38 may be transversely spaced at least about 7 cm apart on centers, so that the outboard bonds are spaced outwardly of and do not overly the core 12B. The outboard bonds 38, or the central bond 38, may be considered secondary bonds 38 if such bonds only join a portion of the layers 27 of the cleaning strip element 25 to the sheet 12, directly or indirectly.

Typically, all layers 27 of the cleaning strip element 25 are joined to the sheet 12 by at least one bond 38. The layer 27 closest to the sheet 12 may be considered the first layer 27. Succeeding layers 27 are considered relatively proximate to the sheet 12 and may be considered the second layer 27, third layer 27, fourth layer 27, etc. in turn. Layers 27 further from the sheet 12 and closest to or contacting the floor are considered distal layers 27.

The bonds 38 may be longitudinally coextensive with or slightly shorter than the sheet 12. In a less preferred embodiment, the outboard bonds 38 may join only the portions of the cleaning strip element 25 which are remote from and not proximate to the sheet 12.

This arrangement provides relatively longer cleaning strips 17 on the target surface and shorter cleaning strips 17 inward thereof. It is believed that having different lengths of cleaning strips 17 improves the cleaning efficacy by allowing the cleaning strips 17 to move independently of each other and create separation therebetween. Such separation between cleaning strips 17, and particularly presenting cleaning strips 17 in superimposed layers, is believed important in providing sufficient area to surface being cleaned, for soil to be both efficaciously picked up and retained by the cleaning article 10. Thus the layers 27 may be made with a single fold, plural folds, or by simple superposition with no folds.

The cleaning strip element 25 may be joined to the sheet using a sinusoidally shaped bond 38, zig-zag bond 38, all of which are collectively referred to as a serpentine bond 38 or other non-straight bond 38. This bond 38 pattern provides both relatively longer and relatively shorter individual cleaning strips 17. Also, the cleaning strips 17 each have a respective proximal end which is not parallel to the longitudinal axis. This geometry provides a proximal end which is believed to promote twisting and disruption of the cleaning strip during cleaning.

Alternatively the central bond 38 may comprise an array of discrete bonds 38, as disclosed in commonly assigned EP Application Serial No. 15162895.5. Discrete bonds 38 are prophetically believed to promote the dynamically changing presentation of the cleaning strip element 25 to the target surface during ordinary use.

The differential length cleaning strips 17 are believed to present different strips 17 and/or portions thereof to the target surface in use. The irregular proximal ends of the cleaning strips 17 are also believed to present different strips 17, or portion thereof, to the target surface in use.

Generally, by presenting different cleaning strips 17 and/or different portions of cleaning strips 17, to the target surface in use, it is believed that saturated portions of the cleaning article 10 do not remain in contact with the target surface. Different portions of the cleaning strip element 25 are presented in use, minimizing re-deposition and allowing unsaturated portions of the cleaning strip element 25 to contact, absorb and retain liquid from the target surface. By dynamically changing the effective portions of the cleaning strip element 25 which contact the target surface, improved cleaning is believed to occur. Significantly, the dynamically changing effective portions of the cleaning strip element 25 occurs automatically and without user intervention, other than the normal back and forth strokes which are part of normal cleaning.

The elongate tow fiber bundle 29 may be disposed in a rope or channel oriented transverse to the major axis of the strips 17. By transverse, it is meant that the tow fibers 29 have a major axis that is oriented at least 30, preferably at least 45 and more preferably about 90 degrees to the major axis of the strips 17. This arrangement reduces the chance of undesired entanglement of the tow fibers 29 and strips 17, while allowing for mobility of the strips 17 and, as desired static positioning or mobility of the tow fiber bundle 29. Further, it is believed that not having the tow fiber bundle 29 cover the entire footprint of the cleaning article 10, better cleaning occurs.

Tow fibers 29, tend to matt and clump when wetted, decreasing cleaning efficacy, so the cleaning article 10 may be used dry. The tow fiber bundle 29 may be joined to the sheet 12 or cleaning strip element 25 in face-to-face relationship. The tow fiber bundle 29 may be suitable for and disposed for directly contacting the target surface during cleaning. Alternatively, the tow fiber bundle 29 may be disposed between the sheet 12 and cleaning strip element 25.

The tow fibers 29 may be synthetic. As used herein "bundle fibers" and/or "tow" refer to tow fibers 29 comprising synthetic polymers including polyester, polypropylene, polyethylene, bio-derived polymers such as polylactic acid, bio-polyethylene, bio-polyester and the like. Tow fibers 29 also include fibers from natural sources such as cellulose, cellulose acetate, flax, hemp, jute and mixtures thereof manufactured wherein the individual fibers are relatively long strands manufactured in bundles. Tow fibers are a component in Swiffer® Dusters™ sold by the instant assignee.

The tow fibers 29 may be defined as fibers having distinct end points and being at least about 1 cm, preferably at least about 3, more preferably at least about 4 and more preferably at least about 5 in length. The tow fibers 29 may extend continuously and in a substantially transverse direction, between the transverse edges of the article 10.

The optional carrier sheet(s) 12, cleaning strip element 25 and tow fiber bundle(s) 29 may be joined by a plurality of permanent bonds 38. The bonds 38 are intended to minimize or prevent stray or dislodged tow fibers 29 from becoming loose. Such sheet(s) 12, cleaning strip element 25 and tow fiber bundle(s) 29 may typically be directly superimposed on one another, with or without intervening members or components therebetween.

Referring to FIGS. 2A-2E the tow fiber bundle(s) 29 may be distended from and protrude outwardly from the plane of the cleaning strip element 25. This arrangement prophetically provides the benefit that the longitudinal axis LA of the cleaning article 10 is slightly elevated from the target surface, allowing larger particles to be captured by the tow fibers and not accumulate at the longitudinal edges 20. If desired, the cross section of the bundle of tow fibers 29 may be thicker in the Z direction as the longitudinal axis LA is approached, increasing the prophetic benefit of allowing large particle entry.

Figure 2E:
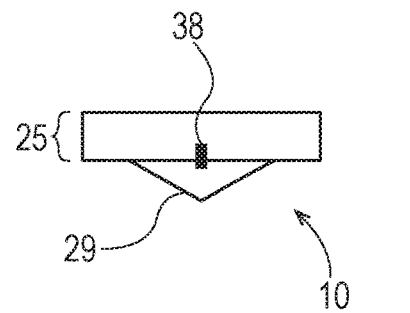
FIG. 2E is a schematic vertical sectional view of an alternative embodiment cleaning article having a variable thickness tow fiber bundle.

Referring particularly to FIG. 2E, the tow fiber bundle 29 may have variable thickness, as taken in the Z direction. This geometry provides the benefit that if the thickest region is juxtaposed with the longitudinal axis, prophetically more particles will travel further into the outwardly facing surface of the cleaning article 10, i.e. closer to the longitudinal axis LA, increasing the cleaning area before the cleaning article must be restored or discarded.

Figure 2F:
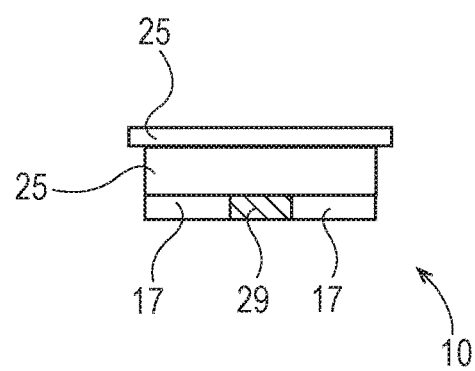
FIG. 2F is a schematic vertical sectional view of an alternative embodiment cleaning article having a tow fiber bundle recessed between two rows of strips.

Referring to FIG. 2F, alternatively, the tow fiber bundle 29 may be recessed into the cleaning strip element 25. This arrangement provides the benefit that the cleaning article is more compact, particularly in the Z-direction.

Referring to FIGS. 2A-2F, the tow fiber bundle 29 may be joined to the cleaning strip element 25 by a bond 38, which bond 38 longitudinally extends throughout the length of and is coextensive with the tow fiber bundle 29. Alternatively, portions of the tow fiber bundle 29 may not be joined to the cleaning strip element 25.

Figure 3G:
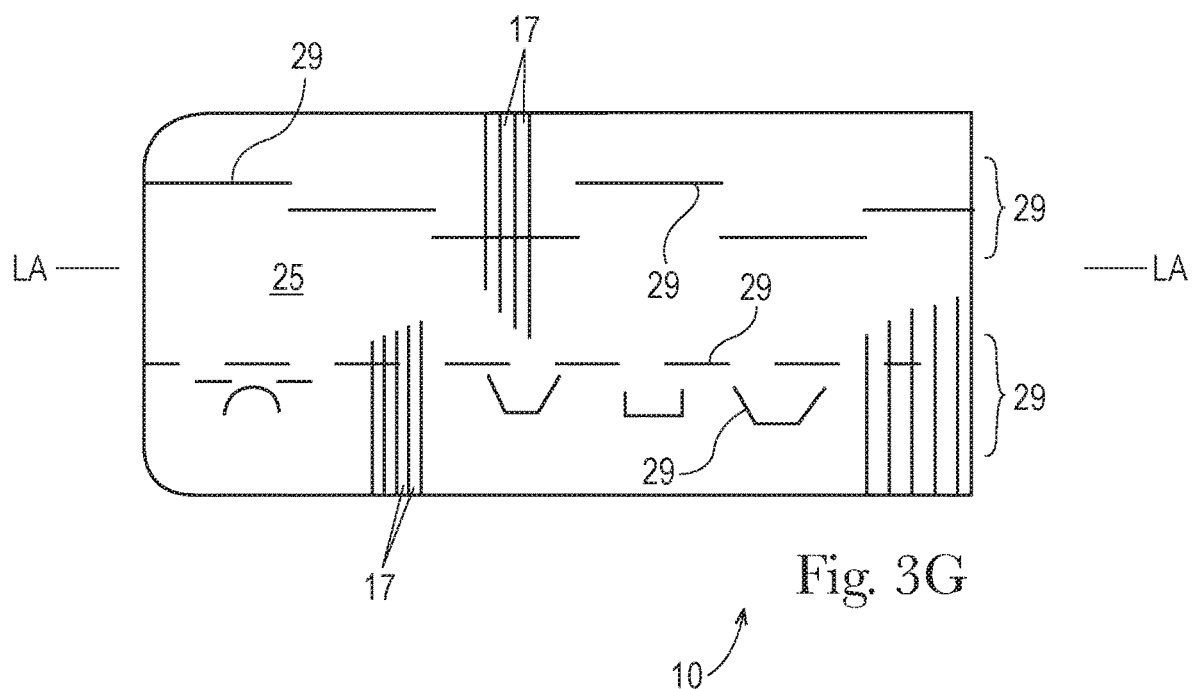
FIG. 3G is a schematic bottom plan view of a cleaning article having plural discrete interrupted tow fiber bundles which fully cover the longitudinal dimension of the cleaning article, the proximal ends of the strips having different offsets from the longitudinal axis.
Figure 3C:
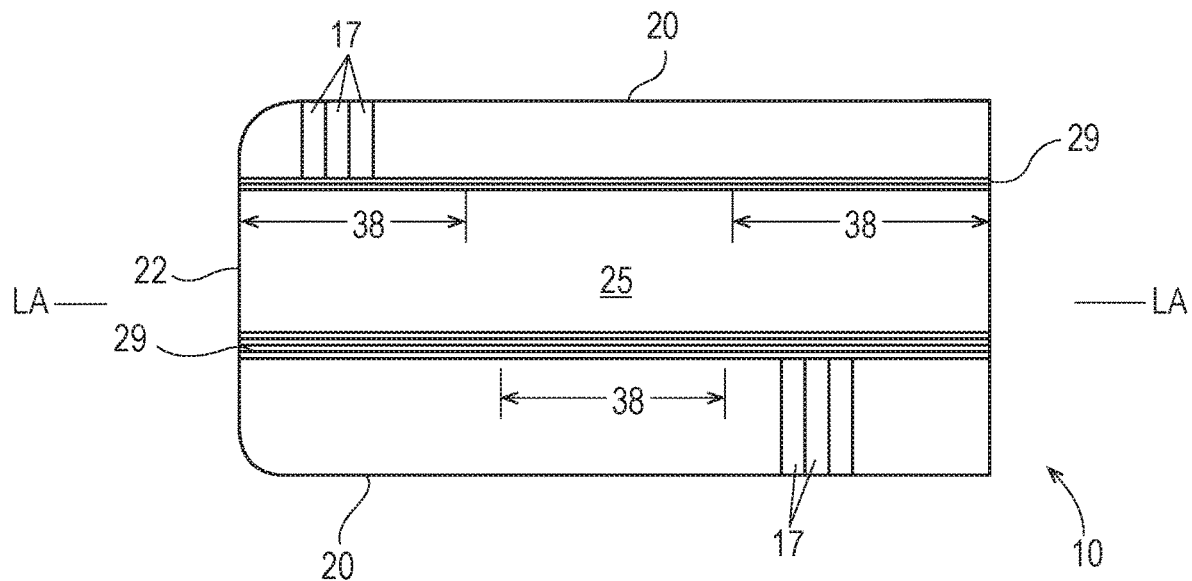
FIG. 3C is a schematic bottom plan view of a cleaning article having plural elongate tow fiber bundles, one tow fiber bundle being of narrow width and closer to the longitudinal edge of the cleaning article and having bonded outboard trisections, one tow fiber bundle being of greater width and closer to the longitudinal axis of the cleaning article and having a bonded central trisection.

Referring to FIG. 3C, for example, only the longitudinally outboard trisections of the two fiber bundle 29 may be joined to the cleaning strip element by a bond 38. The central trisection of the tow fiber bundle 29 may be unbonded, allowing the central trisection to float, and present a dynamic surface area to the floor. Alternatively, the center of the tow fiber bundle 29 may be bonded and the longitudinal ends of the tow fiber bundle 29 may be unbonded, allowing the ends to freely move back and forth. While the exemplary cleaning article 10 is illustrated to have bonded and unbonded regions of the tow fiber bundle 29 divided in the trisections, one of skill will recognize the invention is not so limited. The bonded and unbonded regions of the tow fiber bundle 29 may be of any suitable length and repeat along the elongate tow fiber bundle 29.

Without being bound by theory, it is believed that such intermittent bonding allows any unbonded portion of the tow fiber bundle 29 to present a dynamic surface area to the target surface and reach into crevices, grout lines, etc. The bonded portions of the tow fiber bundle 29 do not present a dynamic surface, advantageously providing dual cleaning capability.

Figure 3D:
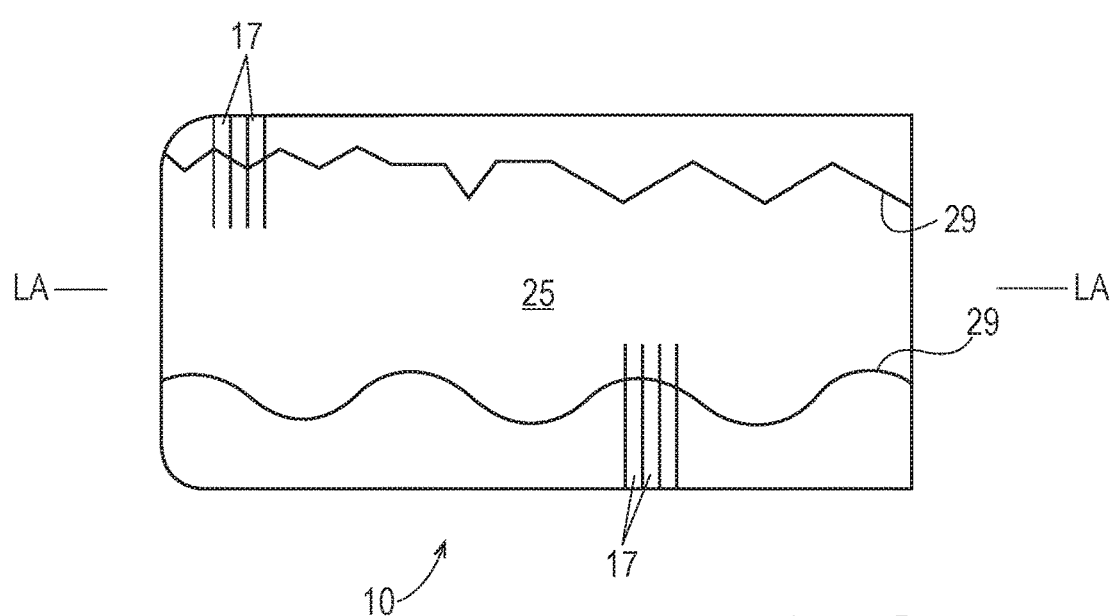
FIG. 3D is a schematic bottom plan view of a cleaning article having plural elongate tow fiber bundles, one tow fiber bundle being of a variable pitch, amplitude and thickness in a zig zag pattern, one tow fiber bundle being a constant sinusoidal pattern.

Referring to FIG. 3D the tow fiber bundle 29 may be disposed in a sharp zig-zag or sinusoidal pattern, both collectively referred to as serpentine. This arrangement provides the benefit that the tow fibers 29 are disposed at different positions relative to the longitudinal axis and prophetically provide better cleaning for different sizes of particulates. If such serpentine pattern is selected, the repeats may have a constant or variable wavelength, amplitude and tow fiber bundle 29 thickness.

As shown, the tow fiber bundle 29 may bridge the strips 17. Prophetically, this arrangement provides the benefit that as the strips 17 move, due to differential engagement with the target surface, the tow fiber bundle 29 will likewise move. If the tow fiber bundle 29 moves against the target surface, it is believed that improved pickup of debris will occur. If desired, the tow fiber bundle 29 may be cut at one or more positions, corresponding to the slits between the strips.

Such an embodiment may be accomplished by bonding the tow fiber bundle 29 to the layers 27 intended to form the cleaning strip element 25. The layers 27 are then cut into the individual strips 17. The tow fiber bundle 29 is likewise cut, at positions corresponding to the slits defining strips 17. Thus, each strip 17 has a portion thereof with a respective portion of a tow fiber bundle 29 joined thereto and dynamically contacting the target surface during cleaning.

Referring to FIGS. 3E1-3E2, the tow fiber bundle 29 may be of variable width in the X direction, parallel to the transverse axis TA. This arrangement prophetically provides the benefit of more surface area in the forward/backward sweeping directions to intercept particles. This arrangement also provides different effective lengths for the cleaning strips 17, prophetically improving dynamic surface area presented to the target surface. Prophetically an hourglass shaped tow fiber 29, as shown in FIG. 3E1, may funnel particles to the center of the cleaning article 10.

Figure 3F:
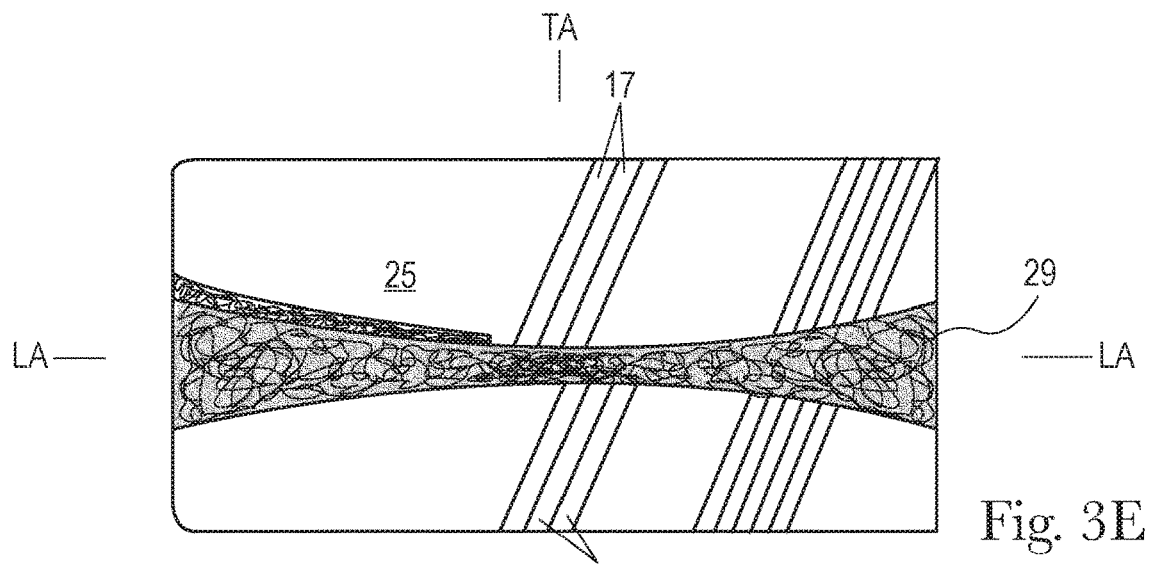
FIG. 3F is a schematic bottom plan view of a cleaning article having plural tow fiber bundles diagonally oriented relative to the longitudinal axis and which fully cover the longitudinal dimension of the cleaning article.
Figure 3F:
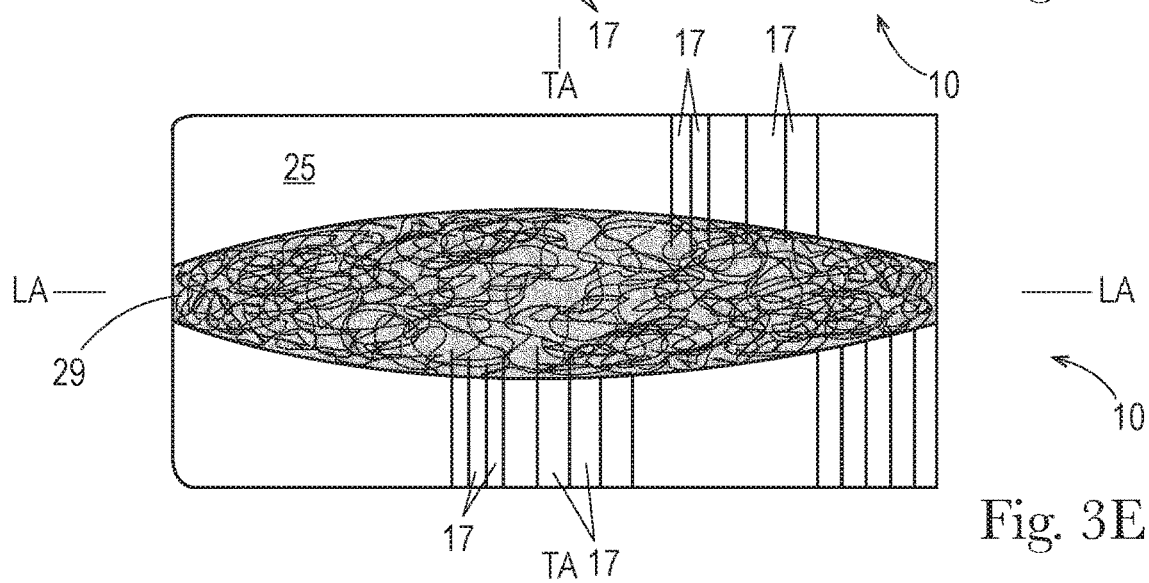
Figure 3F:
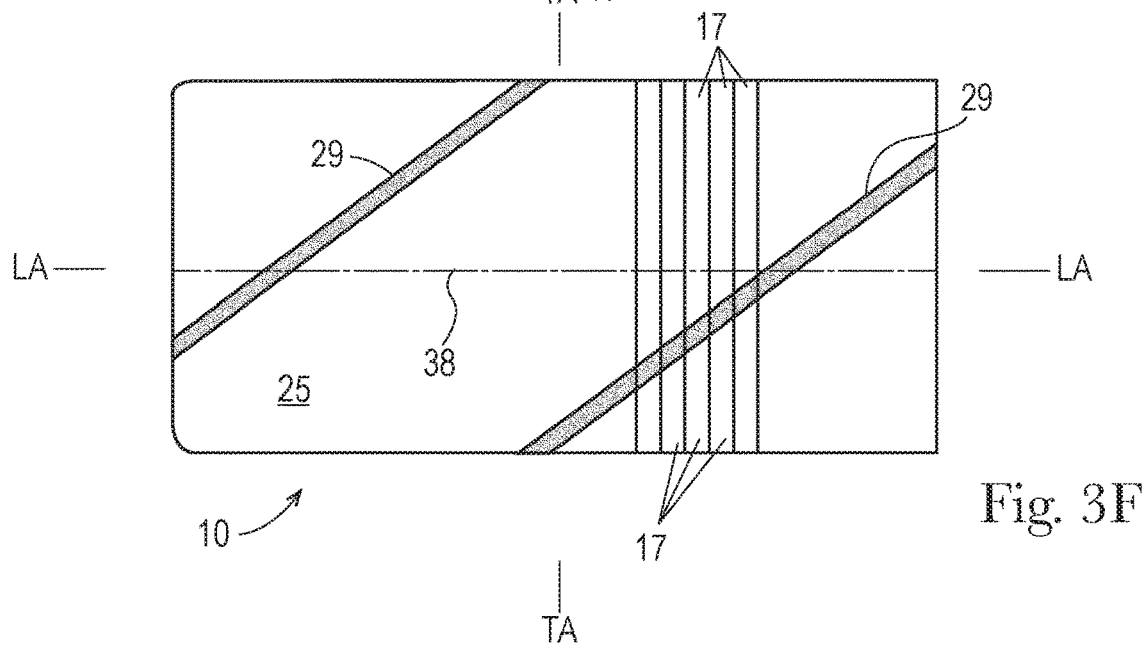

Referring to FIG. 3F the plural tow fiber bundles 29 may be diagonally oriented relative to the longitudinal axis LA. Preferably the tow fiber bundles 29 fully cover the longitudinal dimension of the cleaning article 10, so that the entire length of the cleaning article 10 advantageously intercepts particles. If such an embodiment is selected, preferably no portion of the cleaning article 10 has a line in the transverse direction which does not intercept a tow fiber bundle 29.

As discussed relative to FIG. 3D, the tow fiber bundles 29 may be joined to the strips 17 at positions intermediate the proximal and distal ends of the strips 17. The diagonal arrangement shown provides the benefit that the tow fiber bundle 29 is joined to the strips 17 at different positions along the length thereof. Prophetically, this provides the benefit that the tow fibers will react differently against the target surface during cleaning and provide improved efficacy.

Referring to FIG. 3G, the one or more tow fiber bundles 29 may be discrete and longitudinally spaced apart from adjacent tow fiber bundles. This arrangement prophetically provides the benefit that different sized particles can intercept different discrete tow fibers 29 bundles.

Referring to FIG. 3H, the tow fiber bundle 29 may have discrete bonds 38 which are spaced apart in the longitudinal direction. The tow fiber bundle 29 may be cut intermediate the bonds 38. This arrangement provides tow fibers extending from proximal ends at the bonds 38 to respective distal ends. The distal ends are free and can move against the target surface. This arrangement is believed to promote efficacious cleaning as the tow fibers present dynamic movement to the target surface.

The bonds 38 may be generally perpendicular to the longitudinal axis LA, or may be skewed relative thereto.

Likewise, the cuts intermediate the bonds 38 may be generally perpendicular to the longitudinal axis LA, or may be skewed relative thereto. Prophetically cuts oblique to the longitudinal axis LA provide the benefit of differential length tow fibers.

The bonds 38 may be longitudinally spaced apart as desired. Prophetically a pitch of 2 to 12 cm, or 3 to 6 cm, would be feasible, providing tow fibers with a cut length of 1 to 6 cm.

The bond(s) 38 may be formed by adhesive bonding, thermal bonding, ultrasonic bonding, etc. In thermal bonding and ultrasonic bonding, energy and compressive pressure are applied to local bond 38 sites. The synthetic sheet 12 and synthetic tow fibers 29 are melted at such local sites. Upon refreezing, the local materials of sheet 12 and tow fibers 29 are refreeze together at such local sites, forming localized welds which are the bonds 38.

Any of the sheet 12, cleaning strip element 25 and/or layer of tow fibers 29 may optionally be completely or partially coated with adhesive, wax, Newtonian or non-Newtonian oils or a combination thereof, in order to improve cleaning and increase retention of absorbed debris. If desired, the cleaning article 10 may optionally be used with a cleaning solution or other solution usable for other purposes such as treating the surface for appearance or disinfectant, etc. The cleaning solution may be pre-applied to the cleaning article 10, creating a pre-moistened cleaning article 10 or may be contained within a separate reservoir for dosing onto the cleaning article 10 and/or target surface. The cleaning solution may comprise a majority water, and at least about 0.5, 2, 5 or 10 weight % solids, or at least about 30 or 50 weight % aqueous solvents, non-aqueous solutions or mixtures thereof.

The optional carrier sheet 12, cleaning strip element 25 and tow fiber bundle 29 may be of a matched color, providing for simplicity of manufacture. Alternatively, any of the carrier sheet 12, if present, and cleaning strip element 25, and the tow fiber bundle 29 may be of a first color and the other component[s] may be a second, contrasting color. This arrangement may provide the benefit of showing debris pickup during cleaning. Of course other color combinations are feasible.

Referring to FIGS. 1-3H, it is to be understood that any of the embodiments and variations shown therein may be used in combination with any other embodiment and variant shown therein. For example, in any embodiment the strips 17 may be of constant or variable length, width and/or spacing, and extend in one or more rows. In any embodiment, the rows of strips 17 in any variation or combination may partially or entirely extend between opposing ends of the cleaning article 10 in any desired number of layers 27. In any embodiment, the strips 17 may be perpendicular to the longitudinal axis LA or in any desired angular relationship relative thereto.

Likewise, in any embodiment any number of fiber bundles 29 may be disposed in any position relative to the strips 17. In any embodiment, the fiber bundle[s] 29 may be constant or variable width, thickness and position relative to the longitudinal axis LA. In any embodiment, the fiber bundle[s] 29 may be cut coincident or intermediate the slits between strips 17 or the fiber bundle[s] may extend uninterrupted partially or entirely between the ends of the cleaning article 10.

The tow fiber bundle 29 is illustrated as extending the entire longitudinal dimension of the cleaning article 10. One of skill will recognize the invention is not so limited. The tow fiber bundle may extend only partially between the shorter ends of the cleaning article 10. Or one portion of the cleaning article may have no tow fiber bundle 29 and another portion of the cleaning article 10 may have one, two or more tow fiber bundles 29.

Figure 4:
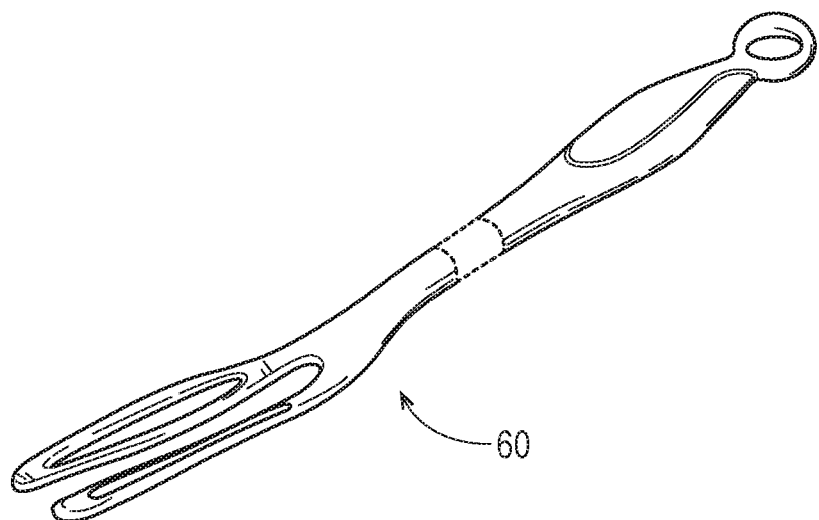

Referring to FIG. 4, the cleaning article 10 may be removably attachable to a handle 60. Particularly, an attachment system may provide for removable attachment of the cleaning article 10 to a suitable and optional handle 60. The cleaning article 10 attachment system and optional complementary handle 60 attachment may comprise adhesive joining, cohesive joining, mechanical engagement through sleeves, etc. One common attachment system comprises sleeves into which the tine[s] of the handle 60 may be inserted. Suitable handles 60 are disclosed in commonly assigned U.S. Pat. No. 8,578,564 and D674,949 S.

Figure 5A:
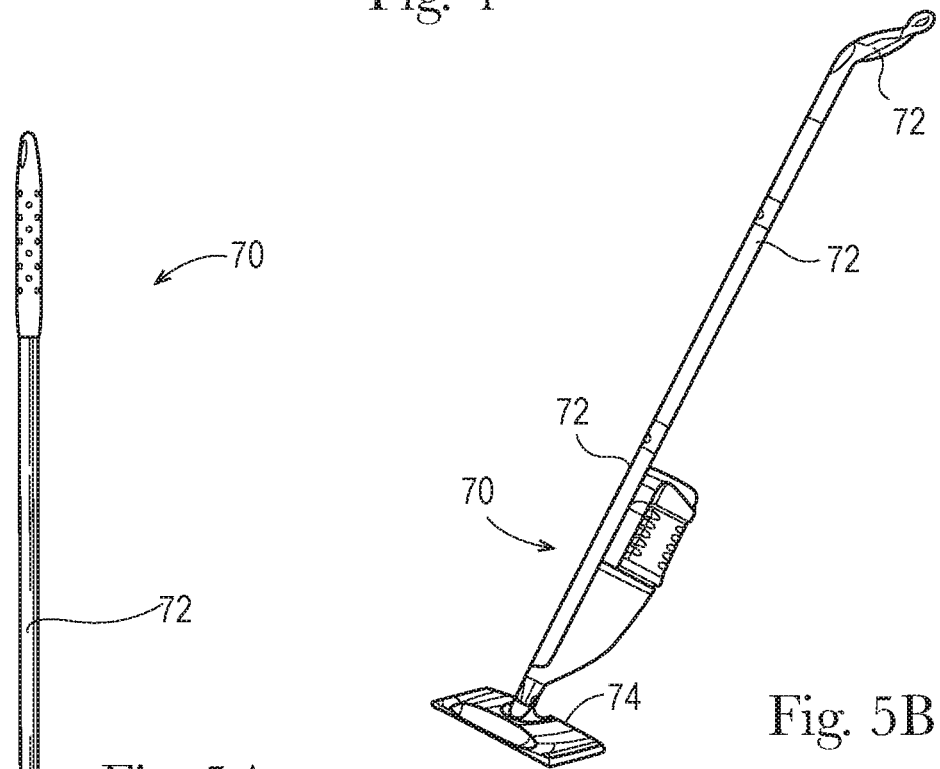
FIG. 5A is a perspective view of a floor cleaning implement usable with the present invention having a schematic cleaning article attached thereto.
Figure 5B:
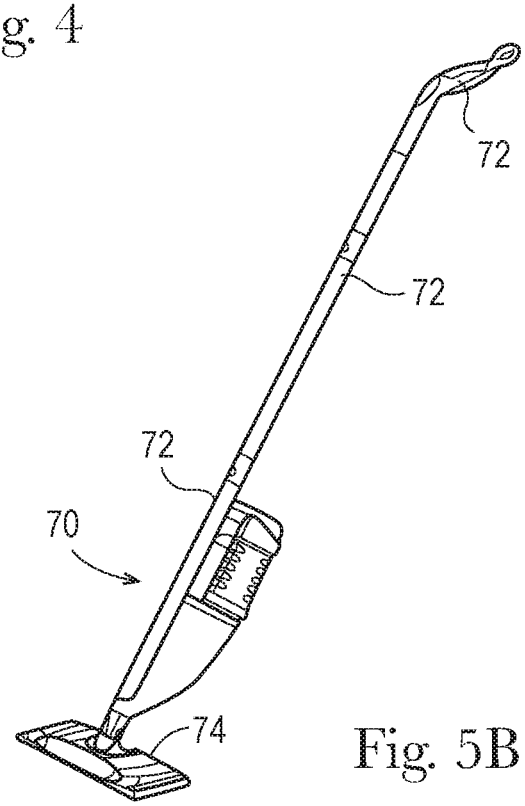

Referring to FIGS. 5A and 5B, the cleaning article 10 may be removably attachable to an implement 70 for use with dry, wet and/or prewetted cleaning depending upon the particular task. Particularly, a floor cleaning implement 70 may allow for cleaning of the floor while the user is upright, and may also provide for spraying of cleaning solution or other liquid to the floor. A typical floor cleaning implement 70 has a handle 72 for grasping by the user and a head 74 attached thereto, and preferably pivotally attached thereto. The head 74 moves against the floor, or other target surface. The cleaning article 10 may be removably attached to the bottom of the head 74. The strips 17 may be bounded by the footprint of the head 74 in use, promoting dynamic movement of the strips 17 during cleaning. In FIG. 5A, the cleaning article 10 has strips disposed on one side only and oriented in a chevron pattern. The other side is free of and does not have strips 17.

Removable attachment of the cleaning article 10 to the implement 70 may be accomplished using adhesive, hook and loop systems, and grippers. Grippers and a suitable cleaning implement 70 are disclosed in commonly assigned U.S. Pat. No. 6,484,356. A suitable implement 70 having an optional vacuum is disclosed in U.S. Pat. No. 7,137,169. Suitable spray implements 70, as shown in FIG. 5B are disclosed in commonly assigned U.S. Pat. Nos. 5,888,006; 5,988,920; 6,842,936; 7,182,537; 7,536,743; 7,676,877 and 8,186,898.

If desired, the cleaning article 10 may be used with and removably attached to an autonomously moving robot or drone. Suitable examples of robots and drones for use with the cleaning article of the present invention are found in commonly assigned U.S. Pat. Nos. 6,941,199, 6,810,305, 6,779,217, 6,481,515, 6,459,955 and Ser. No. 14/992,195, filed Jan. 11, 2016, P&G Case 14189.

The cleaning article 10 may also be used manually, without a handle 60 or implement 70. If desired, various cleaning articles 10 described herein may be packaged and sold in a kit. This arrangement provides the benefit that the user has a choice of different cleaning articles 10 for different tasks. For example, if desired, plural sizes of the cleaning articles 10 may be sold together as a single kit. This arrangement allows the user to select the particular cleaning article 10 best suited for the immediate task.

Combinations

Without limitation, the invention may be made according to any of paragraphs A-T, or in other embodiments as well.

A. A cleaning article for cleaning a target surface, said cleaning article comprising:

a cleaning strip element comprising a plurality of strips, each strip extending from a respective proximal end to a respective distal end remote therefrom, said cleaning strip element having a first surface and a second surface opposed thereto, and a tow fiber bundle joined to said first surface of said cleaning strip element, said tow fiber bundle being oriented generally transverse to said strips.

B. A cleaning article according to paragraph A having a longitudinal axis and two rows of mutually opposed strips extending outwardly therefrom, said cleaning article being generally rectangular and having two opposed longer sides alternatingly disposed with two opposed shorter sides, said strips being generally aligned with said shorter sides of said cleaning article.

C. A cleaning article according to paragraphs A and B, having a longitudinal axis and two rows of mutually opposed strips extending outwardly therefrom, said cleaning article being generally rectangular and having two opposed longer sides alternatingly disposed with two opposed shorter sides, said strips being generally aligned with said shorter sides, and said tow fiber bundle being generally parallel to said longer sides, and extending substantially from one shorter side to the other shorter side of said cleaning article.

D. A cleaning article according to paragraphs A, B and C, having a longitudinal axis and two rows of mutually opposed strips extending outwardly therefrom, said cleaning article being generally rectangular and having two opposed longer sides alternatingly disposed with two opposed shorter sides, said fiber bundle being disposed between said opposed rows of strips and juxtaposed with the proximal ends thereof.

E. A cleaning article according to paragraphs A, B, C and D, having a longitudinal axis and two rows of mutually opposed strips extending outwardly therefrom, said cleaning article being generally rectangular and having two opposed longer sides alternatingly disposed with two opposed shorter sides, said fiber bundle being intermittently bonded throughout the longitudinal direction.

F. A cleaning article according to paragraphs A, B, C, D and E, having a longitudinal axis and two rows of mutually opposed strips extending outwardly therefrom, said cleaning article being generally rectangular and having two opposed longer sides alternatingly disposed with two opposed shorter sides, said fiber bundle being intermittently bonded throughout the longitudinal direction with a plurality of spaced apart bonds, said tow fiber bundle being slit in a plurality of slit locations intermittent said plurality of bonds.

G. A cleaning article according to paragraphs A, B, C, D, E and F, further comprising a carrier sheet, said carrier sheet being joined to said second surface of said cleaning strip element.

H. A cleaning article according to paragraphs A, B, C, D, E, F and G, having a longitudinal axis and two rows of mutually opposed strips extending outwardly therefrom, said cleaning article being generally rectangular and having two opposed longer sides alternatingly disposed with two opposed shorter sides, said tow fiber bundle being disposed between said opposed rows of strips and juxtaposed with the proximal ends thereof, said tow fiber bundle being bonded to said cleaning strip element in a serpentine pattern.

I. A cleaning article for cleaning a target surface, said cleaning article comprising:

a carrier sheet, a cleaning strip element comprising a plurality of strips, said cleaning strip element having a first surface and second surface opposed thereto, said slits being defined by slits therebetween, each strip extending from a respective proximal end to a respective distal end remote therefrom and defining a length therebetween, said cleaning strip element having an inwardly oriented surface and an outwardly oriented surface opposed thereto, said inwardly oriented surface of said cleaning strip element being joined to said carrier sheet in laminate form and an elongate tow fiber bundle joined to said outwardly oriented surface of said cleaning strip element.

J. A cleaning article according to paragraphs A, B, C, D, E, F, G, H and I, said cleaning article being generally rectangular and having two opposed longer sides alternatingly disposed with two opposed shorter sides, said strips being disposed in a row and aligned and generally aligned with one of said shorter sides, said fiber bundle being joined to said strips intermediate said proximal ends and said distal ends.

K. A cleaning article according to paragraphs A, B, C, D, E, F, G, H, I and J, said cleaning article being generally rectangular and having two opposed longer sides alternatingly disposed with two opposed shorter sides, said strips being generally aligned with said shorter sides and disposed in two outwardly oriented rows, and comprising two tow bundles one said tow bundle being disposed on each said outwardly oriented row of strips intermediate said proximal ends and said distal ends of said strips, said tow fiber bundle being cut at said slits to thereby be bonded to a respective strip.

L. A cleaning article according to paragraphs A, B, C, D, E, F, G, H, I, J and K, said cleaning article being generally rectangular and having two opposed longer sides alternatingly disposed with two opposed shorter sides and defining a longitudinal axis, said strips being generally aligned with said shorter sides and disposed in two outwardly oriented rows, said elongate cleaning strip element being oriented generally transverse to said length of said strips, whereby said elongate tow fiber bundle has a variable width.

M. A cleaning article according to paragraphs A, B, C, D, E, F, G, H, I, J, K and L, said cleaning article being generally rectangular and having two opposed longer sides alternatingly disposed with two opposed shorter sides and defining a longitudinal axis, said strips being generally aligned with said shorter sides and disposed in two outwardly oriented rows, said elongate cleaning strip element being oriented generally transverse to said length of said strips, whereby said elongate tow fiber bundle has a variable thickness, with a maximum thickness juxtaposed with said longitudinal axis.

N. A cleaning article according to paragraphs A, B, C, D, E, F, G, H, I, J, K, L and M, said cleaning article being generally rectangular and having two opposed longer sides alternatingly disposed with two opposed shorter sides, said strips being generally aligned with said shorter sides and disposed in two opposed outwardly oriented rows, said proximal ends of said rows being spaced apart, whereby said elongate tow fiber bundle is recessed between said spaced apart rows of strips.

O. A cleaning article according to paragraphs A, B, C, D, E, F, G, H, I, J, K, M and N, said cleaning article being generally rectangular having two opposed longer sides alternatingly disposed with two opposed shorter sides, said elongate tow fiber bundle being disposed in plural discrete longitudinally spaced apart sections.

P. A cleaning article according to paragraphs A, B, C, D, E, F, G, H, I, J, K, M, N and 0, said cleaning article being generally rectangular having two opposed longer sides alternatingly disposed with two opposed shorter sides and defining a longitudinal axis, said elongate tow fiber bundle being disposed in plural discrete spaced apart sections, each said section of said tow fiber bundle being generally parallel to said longitudinal axis.

Q. A cleaning article for cleaning a target surface, said cleaning article comprising:
a cleaning strip element comprising a plurality of strips, each strip extending from a respective proximal end to a respective distal end remote therefrom, said cleaning strip element having a first surface and a second surface opposed thereto, and
a plurality of tow fiber bundles joined to said first surface of said cleaning strip element, said tow fiber bundles being oriented generally transverse to said strips.

R. A cleaning article according to paragraphs A, B, C, D, E, F, G, H, I, J, K, M, N, O, P and Q, said cleaning article being generally rectangular having two opposed longer sides alternatingly disposed with two opposed shorter sides and defining a longitudinal axis, said each of said elongate tow fiber bundle being generally parallel to said longitudinal axis.

S. A cleaning article according to paragraphs A, B, D, E, F, G, I, J, K, M, N, 0 and Q, said cleaning article being generally rectangular having two opposed longer sides alternatingly disposed with two opposed shorter sides and defining a longitudinal axis, said each of said elongate tow fiber bundles being generally diagonal to said longitudinal axis.

T. A cleaning article according to paragraphs A, B, D, E, F, H, Q, R and S further comprising a carrier sheet joined to said second surface of said cleaning strip element.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article for cleaning a target surface, said cleaning article comprising:
    a cleaning strip element comprising a plurality of strips, each strip extending from a respective proximal end to a respective distal end remote therefrom, said cleaning strip element having a first surface and a second surface opposed thereto, and
    a tow fiber bundle joined to said first surface of said cleaning strip element, said tow fiber bundle being oriented generally transverse to said strips, wherein the plurality of cleaning strips each have a curved or serpentine shape, wherein the tow fiber bundle overlaps at least two strips, wherein the cleaning strip element comprises a serpentine folded member with the width decreasing as the first surface of the cleaning strip element is approached, wherein the cleaning strip element includes a plurality of layers having plural widths.

2. A cleaning article according to claim 1 having a longitudinal axis and two rows of mutually opposed strips extending outwardly therefrom, said cleaning article being generally rectangular and having two opposed longer sides alternatingly disposed with two opposed shorter sides, said strips being generally aligned with said shorter sides of said cleaning article.

3. A cleaning article according to claim 1, having a longitudinal axis and two rows of mutually opposed strips extending outwardly therefrom, said cleaning article being generally rectangular and having two opposed longer sides alternatingly disposed with two opposed shorter sides, said strips being generally aligned with said shorter sides, and said tow fiber bundle being generally parallel to said longer sides, and extending substantially from one shorter side to the other shorter side of said cleaning article.

4. A cleaning article according to claim 1, having a longitudinal axis and two rows of mutually opposed strips extending outwardly therefrom, said cleaning article being generally rectangular and having two opposed longer sides alternatingly disposed with two opposed shorter sides, said fiber bundle being disposed between said opposed rows of strips and juxtaposed with the proximal ends thereof.

5. A cleaning article according to claim 1, having a longitudinal axis and two rows of mutually opposed strips extending outwardly therefrom, said cleaning article being generally rectangular and having two opposed longer sides alternatingly disposed with two opposed shorter sides, said fiber bundle being intermittently bonded throughout the longitudinal direction.

6. A cleaning article according to claim 1, having a longitudinal axis and two rows of mutually opposed strips extending outwardly therefrom, said cleaning article being generally rectangular and having two opposed longer sides alternatingly disposed with two opposed shorter sides, said fiber bundle being intermittently bonded throughout the longitudinal direction with a plurality of spaced apart bonds, said tow fiber bundle being slit in a plurality of slit locations intermittent said plurality of bonds.

7. A cleaning article according to claim 1, further comprising a carrier sheet, said carrier sheet being joined to said second surface of said cleaning strip element.

8. A cleaning article according to claim 1, having a longitudinal axis and two rows of mutually opposed strips extending outwardly therefrom, said cleaning article being generally rectangular and having two opposed longer sides alternatingly disposed with two opposed shorter sides, said tow fiber bundle being disposed between said opposed rows of strips and juxtaposed with the proximal ends thereof, said tow fiber bundle being bonded to said cleaning strip element in a serpentine pattern.

9. A cleaning article for cleaning a target surface, said cleaning article comprising:
    a carrier sheet, a cleaning strip element comprising a plurality of strips, said cleaning strip element having a first surface and second surface opposed thereto, said strips being defined by slits therebetween, each strip extending from a respective proximal end to a respective distal end remote therefrom and defining a length therebetween, said cleaning strip element having an inwardly oriented surface and an outwardly oriented surface opposed thereto, said inwardly oriented surface of said cleaning strip element being joined to said carrier sheet in laminate form and an elongate tow fiber bundle joined to said outwardly oriented surface of said cleaning strip element, wherein the plurality of cleaning strips each have a curved or serpentine shape, wherein the tow fiber bundle overlaps at least two strips across the length thereof, wherein the cleaning strip element comprises a serpentine folded member with the width decreasing as the outwardly oriented surface of the cleaning strip element is approached, wherein the cleaning strip element includes a plurality of layers having plural widths.

10. A cleaning article according to claim 9, said cleaning article being generally rectangular and having two opposed longer sides alternatingly disposed with two opposed shorter sides, said strips being disposed in a row and aligned and generally aligned with one of said shorter sides, said fiber bundle being joined to said strips intermediate said proximal ends and said distal ends.

11. A cleaning article according to claim 9, said cleaning article being generally rectangular and having two opposed longer sides alternatingly disposed with two opposed shorter sides, said strips being generally aligned with said shorter sides and disposed in two outwardly oriented rows, and comprising two tow bundles, wherein said tow bundles are disposed on each said outwardly oriented row of strips intermediate said proximal ends and said distal ends of said strips, said tow fiber bundle being cut at said slits to thereby be bonded to a respective strip.

12. A cleaning article according to claim 9, said cleaning article being generally rectangular and having two opposed longer sides alternatingly disposed with two opposed shorter sides and defining a longitudinal axis, said strips being generally aligned with said shorter sides and disposed in two outwardly oriented rows, said elongate tow fiber bundle being oriented generally transverse to said length of said strips, whereby said elongate tow fiber bundle has a variable width.

13. A cleaning article according to claim 9, said cleaning article being generally rectangular and having two opposed longer sides alternatingly disposed with two opposed shorter sides and defining a longitudinal axis, said strips being generally aligned with said shorter sides and disposed in two outwardly oriented rows, said elongate tow fiber bundle being oriented generally transverse to said length of said strips, whereby said elongate tow fiber bundle has a variable thickness, with a maximum thickness juxtaposed with said longitudinal axis.

14. A cleaning article according to claim 9, said cleaning article being generally rectangular and having two opposed longer sides alternatingly disposed with two opposed shorter sides, said strips being generally aligned with said shorter sides and disposed in two opposed outwardly oriented rows, said proximal ends of said rows being spaced apart, whereby said elongate tow fiber bundle is recessed between said spaced apart rows of strips.

15. A cleaning article according to claim 9, said cleaning article being generally rectangular having two opposed longer sides alternatingly disposed with two opposed shorter sides, said elongate tow fiber bundle being disposed in plural discrete longitudinally spaced apart sections.

16. A cleaning article according to claim 9, said cleaning article being generally rectangular having two opposed longer sides alternatingly disposed with two opposed shorter sides and defining a longitudinal axis, said elongate tow fiber bundle being disposed in plural discrete spaced apart sections, each said section of said tow fiber bundle being generally parallel to said longitudinal axis.

17. A cleaning article for cleaning a target surface, said cleaning article comprising:
a cleaning strip element comprising a plurality of strips, each strip extending from a respective proximal end to a respective distal end remote therefrom, said cleaning strip element having a first surface and a second surface opposed thereto, and
a plurality of tow fiber bundles joined to said first surface of said cleaning strip element, said tow fiber bundles being oriented generally transverse to said strips, wherein the plurality of cleaning strips each have a curved or serpentine shape, wherein the tow fiber bundles overlap at least two strips, wherein the cleaning strip element comprises a serpentine folded member with the width decreasing as the first surface of the cleaning strip element is approached, wherein the cleaning strip element includes a plurality of layers having plural widths.

18. A cleaning article according to claim 17, said cleaning article being generally rectangular having two opposed longer sides alternatingly disposed with two opposed shorter sides and defining a longitudinal axis, said each of said elongate tow fiber bundles being generally parallel to said longitudinal axis.

19. A cleaning article according to claim 17, said cleaning article being generally rectangular having two opposed longer sides alternatingly disposed with two opposed shorter sides and defining a longitudinal axis, said each of said elongate tow fiber bundles being generally diagonal to said longitudinal axis.

20. A cleaning article according to claim 17 further comprising a carrier sheet joined to said second surface of said cleaning strip element.

\* \* \* \* \*